(12) United States Patent
Tsuchihashi et al.

(10) Patent No.: US 9,438,893 B2
(45) Date of Patent: Sep. 6, 2016

(54) METHOD FOR SETTING STEREOSCOPIC IMAGE DATA AT A STEREOSCOPIC IMAGE DISPLAY SYSTEM BY SHIFTING DATA TO A VERTICAL DIRECTION

(71) Applicant: LENOVO (SINGAPORE) PTE. LTD., Singapore (SG)

(72) Inventors: Moriyuki Tsuchihashi, Kanagawa-Ken (JP); Yi Zheng, Kanagawa-Ken (JP)

(73) Assignee: Lenovo (Singapore) PTE LTD, Singapore (SG)

( * ) Notice: Subject to any disclaimer, the term of this patent is extended or adjusted under 35 U.S.C. 154(b) by 499 days.

(21) Appl. No.: 13/938,946

(22) Filed: Jul. 10, 2013

(65) Prior Publication Data

US 2014/0063213 A1    Mar. 6, 2014

(30) Foreign Application Priority Data

Aug. 29, 2012    (JP) .................................. 2012-188227

(51) Int. Cl.
  *H04N 13/04*    (2006.01)
(52) U.S. Cl.
  CPC ...... *H04N 13/0404* (2013.01); *H04N 13/0415* (2013.01); *H04N 13/0447* (2013.01); *H04N 13/0477* (2013.01); *H04N 13/0422* (2013.01)
(58) Field of Classification Search
  CPC ..................... H04N 14/0404; H04N 13/0415; H04N 13/0447; H04N 13/0477; H04N 13/0422
  See application file for complete search history.

(56) References Cited

U.S. PATENT DOCUMENTS

| | | | | |
|---|---|---|---|---|
| 5,521,724 A | * | 5/1996 | Shires | G02B 5/32 359/15 |
| 6,055,027 A | * | 4/2000 | Yamazaki | G02B 27/26 348/E13.004 |
| 6,064,424 A | | 5/2000 | van Berkel et al. | |
| 6,108,005 A | * | 8/2000 | Starks | G02B 27/2207 345/419 |
| 2002/0030887 A1 | * | 3/2002 | Hamagishi | G02B 27/2214 359/463 |
| 2002/0075384 A1 | * | 6/2002 | Harman | A61B 3/113 348/43 |
| 2003/0048354 A1 | * | 3/2003 | Takemoto | H04N 13/0048 348/51 |
| 2003/0214497 A1 | * | 11/2003 | Morishima | G02B 27/2214 345/204 |
| 2005/0052738 A1 | * | 3/2005 | Perlin | G02B 27/0093 359/462 |
| 2006/0285205 A1 | * | 12/2006 | Lipton | G02B 27/2214 359/463 |
| 2007/0008406 A1 | * | 1/2007 | Shestak | G02B 27/2214 348/58 |

(Continued)

FOREIGN PATENT DOCUMENTS

JP    02-050145    2/1990
JP    2004-295013    10/2004

(Continued)

*Primary Examiner* — Jay Patel
*Assistant Examiner* — Joseph Suh
(74) *Attorney, Agent, or Firm* — Antony P. Ng; Russell Ng PLLC

(57) ABSTRACT

A method for moving viewing positions of a stereoscopic image display system is described. Each cylindrical lens is tilted relative to vertical lines. A data stripe for left eye and a data stripe for right eye making up stereoscopic image data are alternately set to correspond to the cylindrical lenses. At a home position, a long axis of the cylindrical lens agrees with the center of each data stripe, thus concentrating light at a predetermined concentrating position. When setting stereoscopic image data at a different position of sub-pixels that is shifted vertically downward from the home position, the center of the data stripe is shifted relative to the long axis by 0.5 times the length of the sub-pixels horizontally to the left thus concentrating light at a concentrating position moved from the home position in the left-right direction.

13 Claims, 8 Drawing Sheets

(56) References Cited

U.S. PATENT DOCUMENTS

| | | | | |
|---|---|---|---|---|
| 2007/0188517 A1* | 8/2007 | Takaki | G02B 27/2214 | 345/613 |
| 2008/0002255 A1* | 1/2008 | Tavor | G02B 27/2214 | 359/464 |
| 2008/0291126 A1* | 11/2008 | Hamagishi | H04N 13/0409 | 345/55 |
| 2009/0052027 A1* | 2/2009 | Yamada | G02B 27/225 | 359/463 |
| 2011/0122236 A1* | 5/2011 | Yamada | G02B 27/2214 | 348/55 |
| 2011/0228183 A1* | 9/2011 | Hamagishi | G02B 27/2214 | 349/15 |
| 2012/0075168 A1* | 3/2012 | Osterhout | G02B 27/017 | 345/8 |
| 2012/0092470 A1* | 4/2012 | Okamoto | G02B 27/2264 | 348/60 |
| 2012/0293501 A1* | 11/2012 | Ishii | H04N 13/007 | 345/419 |
| 2013/0069864 A1* | 3/2013 | Hirooka | G09G 3/003 | 345/156 |
| 2013/0114135 A1* | 5/2013 | Lin | H04N 13/0409 | 359/464 |
| 2013/0267317 A1* | 10/2013 | Aoki | A63F 13/00 | 463/32 |

FOREIGN PATENT DOCUMENTS

| | | |
|---|---|---|
| JP | 2005-258421 | 9/2005 |
| JP | 2007094022 A * | 4/2007 |
| JP | 2012-037712 | 2/2012 |

\* cited by examiner

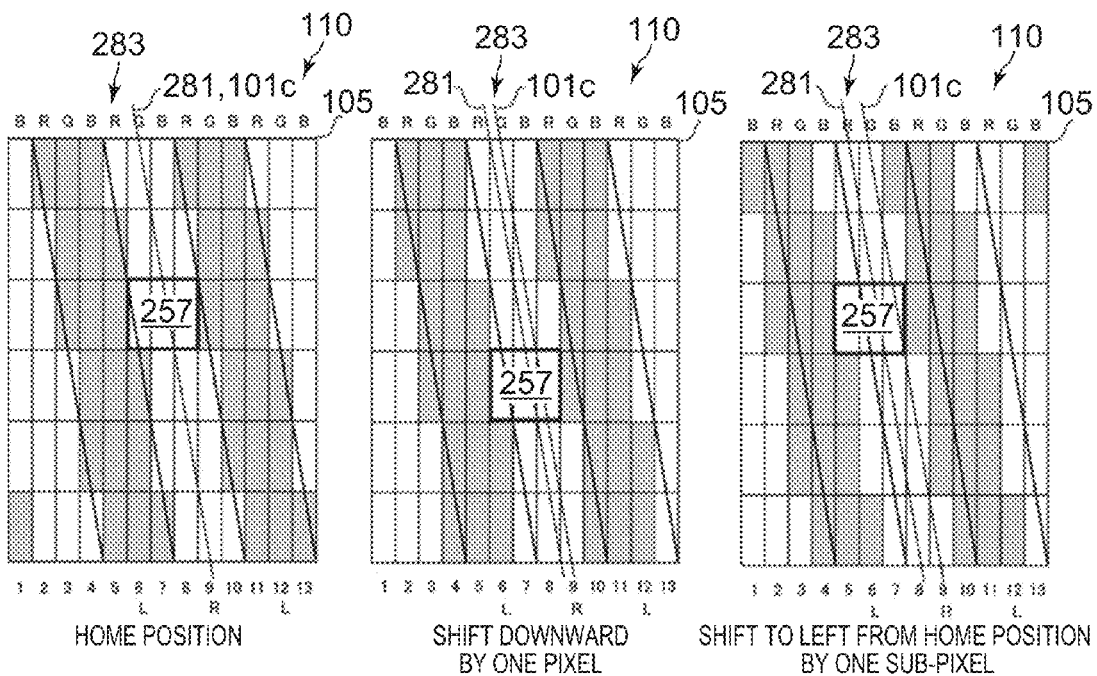
FIG. 4A HOME POSITION
FIG. 4B SHIFT DOWNWARD BY ONE PIXEL
FIG. 4C SHIFT TO LEFT FROM HOME POSITION BY ONE SUB-PIXEL
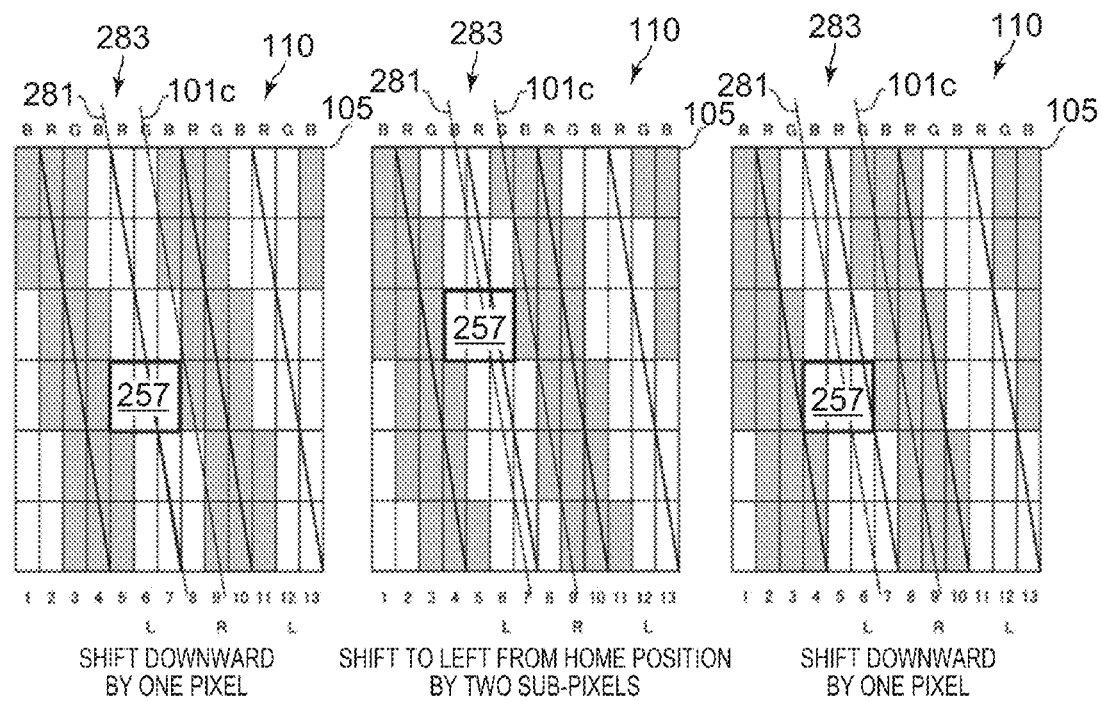
FIG. 5A SHIFT DOWNWARD BY ONE PIXEL
FIG. 5B SHIFT TO LEFT FROM HOME POSITION BY TWO SUB-PIXELS
FIG. 5C SHIFT DOWNWARD BY ONE PIXEL

| HOME POSITION | SHIFT UPWARD BY ONE PIXEL | SHIFT TO RIGHT FROM HOME POSITION BY ONE SUB-PIXEL |

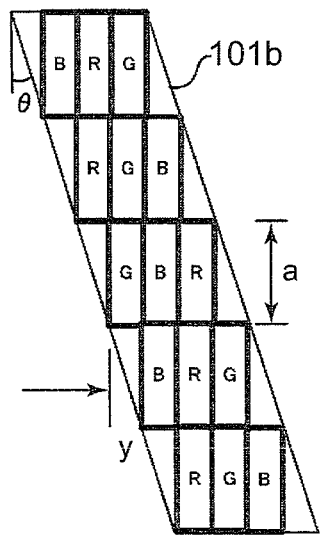
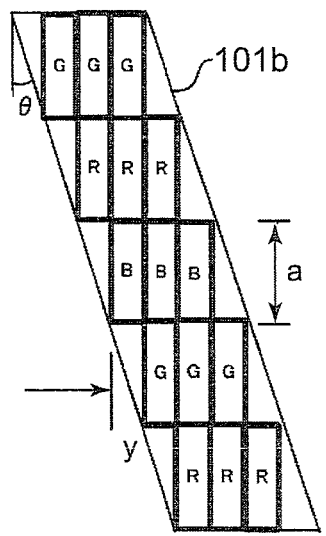
FIG. 9A          FIG. 9B
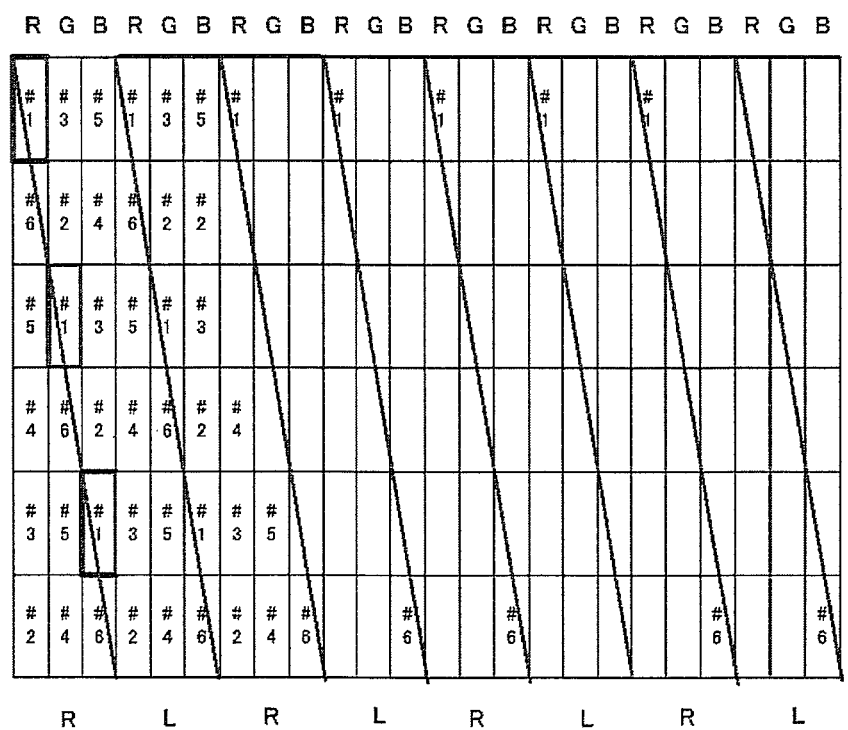
FIG. 10

METHOD FOR SETTING STEREOSCOPIC IMAGE DATA AT A STEREOSCOPIC IMAGE DISPLAY SYSTEM BY SHIFTING DATA TO A VERTICAL DIRECTION

PRIORITY CLAIM

The present application claims benefit of priority under 35 U.S.C. §§120, 365 to the previously filed Japanese Patent Application No. JP2012-188227 with a priority date of Aug. 29, 2012, which is incorporated by reference herein.

BACKGROUND OF THE INVENTION

1. Technical Field

The present invention relates to stereoscopic image display systems in general, and more particularly to a method for setting stereoscopic image data at a stereoscopic image display system.

2. Description of Related Art

A stereoscopic display system for displaying a stereoscopic image on a liquid crystal display so as to be viewable with naked eyes has been put in practice. Such a stereoscopic display system includes a light beam controller disposed at the front face of a pixel matrix, at which left image data shot at a viewpoint of a left eye and right image data shot at a viewpoint of a right eye are set, so as to concentrate a light beam of each pixel, at which left image data is set, at the position of the left eye of the viewer and to concentrate a light beam of each pixel, at which right image data is set, at the position of the right eye of the viewer. The viewer can view a stereoscopic image due to binocular parallax between the left image and the right image.

One prior art stereoscopic image display system includes a lenticular sheet. Positions of viewer's eyes are detected using infrared rays, and as the viewer moves, selection is made whether a signal to be displayed on a pixel is set as a left-eye signal or a right-eye signal, thus securing stereoscopic viewing. At this time, a left-eye signal and a right-eye signal displayed on pixels are inverted in the units of pixels depending on the position of the viewer. Some other prior art stereoscopic image systems display a stereoscopic image through a lenticular lens sheet disposed to be tilted relative to a pixel matrix.

SUMMARY OF THE INVENTION

In stereoscopic imaging implemented by a lenticular sheet, image data for left eye and image data for right eye can be viewed from positions distributed discretely in the left-right direction of a space in front of a flat display. FIG. 12 illustrates the state where a lenticular sheet 11 disposed at a front face of a pixel matrix 13 concentrates light emitted from the pixel matrix 13 at four concentrating positions 15. The pixel matrix 13 is configured so that image data for left eye and image data for right eye are set alternately in the horizontal direction. At the viewing position 0, a viewer can view an image for right eye with the right eye and view an image for left eye with the left eye, and so recognizes the stereoscopic image correctly. At the viewing positions +1 and −1, however, a light beam for left-eye image and a light beam for right-eye image incident on the eyes are inverted, so that the viewer cannot recognize the stereoscopic image correctly.

The stereoscopic image display system may be configured so as to, in response to the detection of viewing positions +1 and −1, exchange image data for left eye and image data for right eye in the units of one pixel, whereby the stereoscopic images at those positions can be recognized correctly. However, as the viewer moves from the viewing position 0 to the viewing position +1 or −1, the quality of the image is degraded gradually, and when the viewer moves beyond the viewing position −0.5 or +0.5, images of light beams incident on the both eyes are inverted, resulting in a failure in viewing a clear stereoscopic image at the positions other than the viewing positions 0, +1 and −1. That is, the range in the left-right direction enabling correct and clear stereoscopic images to be viewed is limited to the range including viewing positions at the three positions and their vicinity range in the left-right direction.

Concentrating positions 15 are determined based on the relative position between the position of stereoscopic image data set at pixels and the lenticular lens (cylindrical lens). This means that, during the movement of a viewer to the viewing position +1 or −1, shifting the setting position of left and right image data at pixels depending on the position of the head of the viewer in the horizontal direction opposite to the movement direction of the head enables light to be concentrated at multiple viewing positions in the moving range. Shifting the setting position of the stereoscopic image data in a smaller unit causes the movement of the viewing position by a shorter distance, and so the viewer can view favorable stereoscopic images at a plurality of positions during the movement from the viewing position 0 to the viewing position +1 or −1.

Herein, one pixel is made up of three or four sub-pixels. Thus, the minimum unit for shift amount of the stereoscopic image data set at the pixel matrix 13 will be a sub-pixel. When one pixel is made up of three sub-pixels aligned in the horizontal direction, shifting of the setting position of the stereoscopic image data in the units of sub-pixels in the left-right direction can provide two concentrating positions till the viewing position +1 or −1, and shifting of the setting position of the stereoscopic image data in units smaller than sub-units enables clear stereoscopic images to be viewed at more positions.

In accordance with a preferred embodiment of the present invention, a light beam controller having a long axis tilted relative to a set of vertical lines at a predetermined tilted angle is provided. The light beam controller is configured to concentrate light beams emitted from a pixel matrix at a predetermined position, and the pixel matrix includes a set of sub-pixels disposed at intersections of horizontal lines and vertical lines. Stereoscopic image data are set at a home position of the pixel matrix in order to concentrate light at a first viewing position. Subsequently, stereoscopic image data are set at a different position that is shifted from the home position by a predetermined number of rows of the horizontal lines in a direction of the vertical lines corresponding to an up-down direction of a viewer in order to concentrate light at a second viewing position that the viewer has moved from the first viewing position in a left-right direction of the viewer.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein:

FIGS. 4A-4C show a state where a viewing position moves by shifting the setting position of stereoscopic image data at a pixel matrix;

FIG. 5A-5C show a state where a viewing position moves by shifting the setting position of stereoscopic image data at a pixel matrix;

FIGS. 9A-9B describe a relationship among the lengthwise-to-crosswise ratio a, the tilted angle θ and the unit movement amount of the stripe center in the horizontal direction;

FIG. 10 shows an example where pixel stripes to display stereoscopic image data are made up of three RGB sub-pixels configured along a line parallel to the long axis of a cylindrical lens;

DETAILED DESCRIPTION OF A PREFERRED EMBODIMENT

Figure 1A:
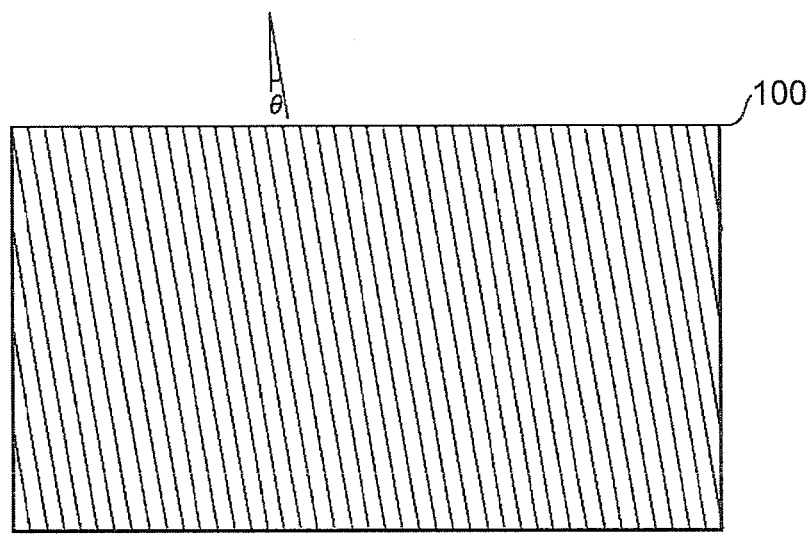
FIGS. 1A-1E describe the configuration of a stereoscopic image display system.
Figure 1B:
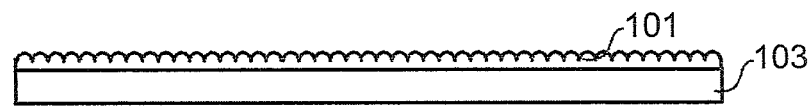
Figure 1C:
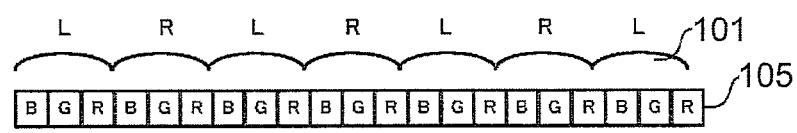

FIGS. 1A-1E describe the configuration of a stereoscopic image display device. FIG. 1A is a front view viewed from a viewer, FIG. 1B is a top view where a viewer views from above, and FIG. 1C is a partial enlarged view of the top view. A stereoscopic image display device 100 includes: a flat panel display (FPD) 103 such as a non self-emissive type liquid crystal display or a self-emissive type plasma display or organic EL display; and a lenticular sheet 101 disposed at the front face. The FPD 103 includes a pixel matrix 105 configured so that several pixels are disposed near the intersections of scanning lines and driving lines. In the present specification, the left-right direction corresponding to binocular parallax of the viewer is referred to as the horizontal direction of the FPD 103 and the up-down direction of the viewer is referred to as the vertical direction of the FPD 103.

When the pixel matrix 105 displays images in color, three sub-pixels of RGB or four sub-pixels of RGBW make up a pixel displaying one color. When the pixel matrix 105 displays images in monochrome, each pixel makes up a pixel displaying a gray scale having certain brightness. Although the present invention is applicable to a FPD displaying images in monochrome, the following exemplifies a color FPD 103 where three sub-pixels make up one pixel.

Figure 1D:
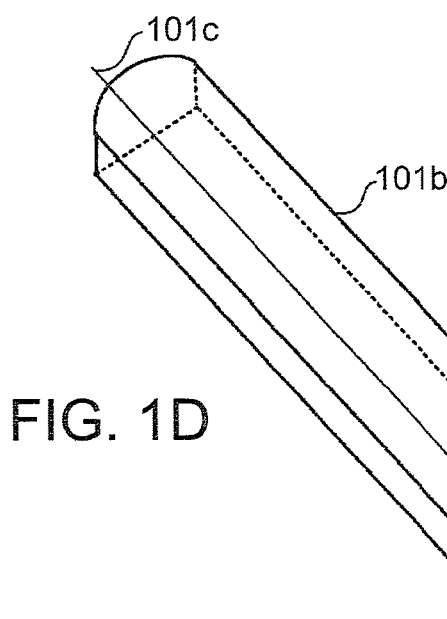
Figure 1E:
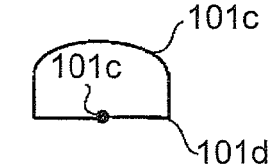

The lenticular sheet 101 includes a set of cylindrical lenses 101b arranged contiguously in the horizontal direction. FIG. 1D is a perspective view of a cylindrical lens 101b, where a long axis 101c is defined. FIG. 1E is a cross-sectional view of the cylindrical lens 101b taken along any plane orthogonal to the long axis 101c. The cylindrical lens 101b is configured so that a cross section taken along a plane orthogonal to the long axis 101c defines a convex lens, and a flat face opposing thereto defines a focal plane 101d.

A light beam radiated from the pixel matrix 105, which is disposed in contact with or at a predetermined distance from the focal plane 101d, passes through the cylindrical lens 101b to be refracted, and so is concentrated at a predetermined position in front of the lenticular sheet 101. Since the cylindrical lens 101b has cross sections aligned in a straight line, the cross sections being orthogonal to the focal plane 101d and being in parallel with the longer axis 101c, a light beam incident through the focal plane 101d is emitted similarly in a sheet glass for the vertical direction.

The traveling direction of a light beam radiated from the pixel matrix 105 hardly changes in the up-down direction of the viewer when it passes through the lenticular sheet 101, but changes in accordance with an incident angle to the lenticular sheet 101 in the left-right direction, thus being concentrated at positions contiguous in the up-down direction. The lenticular sheet 101 includes cylindrical lenses 101b (L) having a lens pitch adjusted to concentrate light at the position of the viewer's left eye and cylindrical lenses 101b (R) having a lens pitch adjusted to concentrate light at the position of the viewer's right eye, the cylindrical lenses 101b (L) and the cylindrical lenses 101b (R) being disposed alternately.

The light beams passing through the cylindrical lenses 101b (L) for left eye can be concentrated at the concentrating position of the left eye, and light beams passing through the cylindrical lenses 101b (R) for right eye can be concentrated at the concentrating position of the right eye. A middle position between the concentrating position for the cylindrical lenses 101b (L) for left eye and the concentrating position for the cylindrical lenses 101b (R) for right eye will be referred to as a viewing position.

The concentrating position is determined based on a relative positional relationship between the setting position of stereoscopic image data at the pixel matrix 105 and the long axis 101c. The stereoscopic image data is made up of image data for left eye and image data for right eye having binocular parallax. Image data for left eye is set at a plurality of pixels disposed at positions where light beams radiated therefrom pass through the cylindrical lenses 101b (L) for left eye and image data for right eye is set at a plurality of pixels disposed at positions where light beams radiated therefrom pass through the cylindrical lenses 101b (R) for right eye, whereby a viewer can view a stereoscopic image at the viewing position due to the binocular parallax. Then, when the lenticular sheet 101 and the stereoscopic image data have a fixed relative positional relationship, the viewing position for the stereoscopic image also will be fixed.

As the viewer moves from a predetermined viewing position to any direction of left and right, the image will become double or blurred. As the viewer further moves in the same direction, image data for left eye and image data for right eye set at pixels disposed at positions where light beams radiated therefrom pass through the cylindrical lenses 101b (L) and the cylindrical lenses 101b (R) are switched, so that the viewer will view an image for right eye with the left eye and view an image for left eye with the right eye. The long axis 101c of the cylindrical lens 101b is tilted at a tilted angle θ to the vertical lines of the pixel matrix 105. Herein the long axis 101c passes through the center of the focal plane 101d and extends in the longitudinal direction of the cylindrical lens 101b.

Figure 2A:
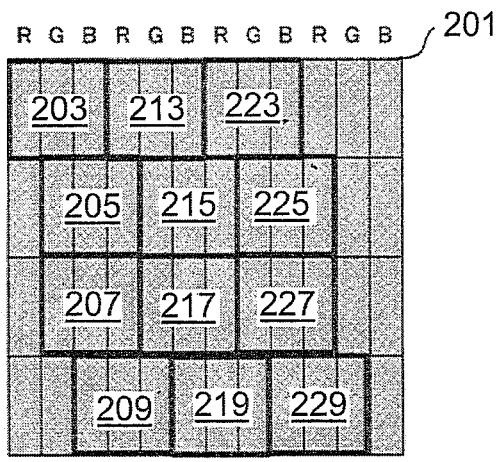
FIGS. 2A-2D describe the data structure of a pixel matrix, at which stereoscopic image data is set.
Figure 2B:
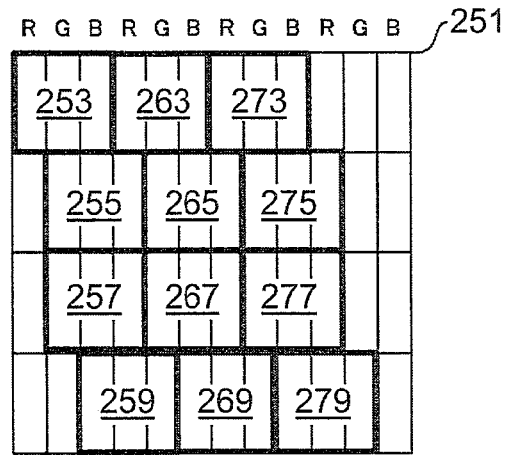
Figure 2C:
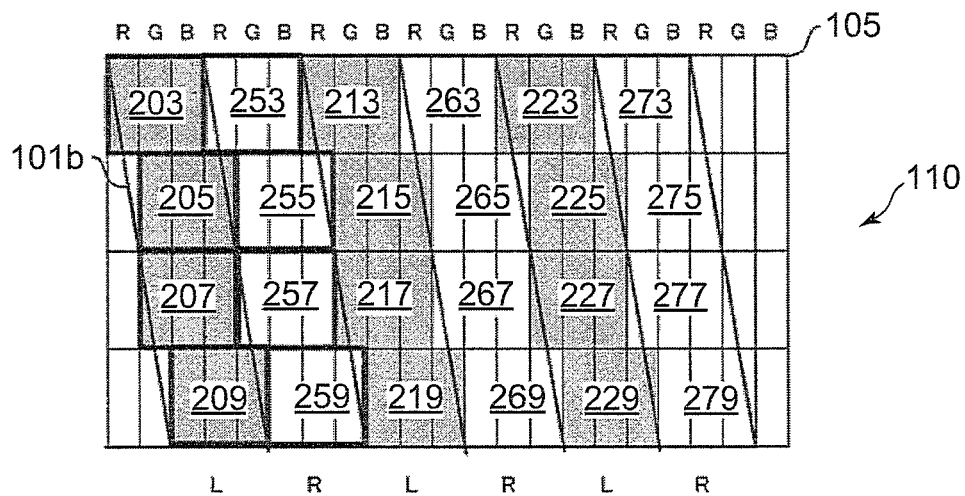
Figure 2D:
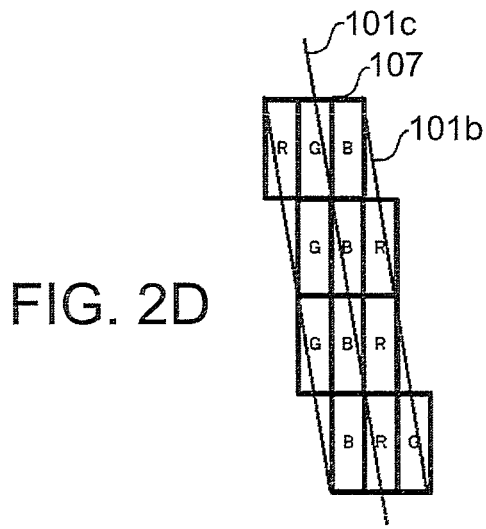

FIGS. 2A-2D describe the data structure of the pixel matrix 105, at which stereoscopic image data is set. FIG. 2A shows a data structure of image data for left eye, FIG. 2B shows a data structure of image data for right eye, FIG. 2C shows a data structure of stereoscopic image data 110 made up of image data 201 for left eye and image data 251 for right eye, and FIG. 2D shows a pixel stripe 107 made up of multiple sub-pixels corresponding to one cylindrical lens 101b.

The number of sub-pixels included in the pixel stripe 107 corresponding to one cylindrical lens 101b is set at the integral multiple of the number of sub-pixels (in this case, three) making up one pixel. The pixel stripe 107 may be configured so that multiple pixels are aligned in the horizontal direction depending on the resolution of sub-pixels. Since the pixel stripe 107 is made up of multiple rectangular sub-pixels disposed at intersections of horizontal lines and vertical lines defined at the pixel matrix 105, the position thereof cannot be such that the entire pixel stripe 107 fits inside the range of the tilted cylindrical lens 101b. Instead, multiple pixels making up the pixel stripe 107 are defined on average so as to be along the long axis 101c.

In one example, the pixel matrix 105 includes a color filter including the arrangement of RGB vertical stripes, where sub-pixels of the same color are arranged in the vertical direction and three sub-pixels contiguously arranged in the horizontal direction make up one pixel. Note that since multiple making up the pixel stripe 107 are disposed to be along the tilted cylindrical lens 101b, RGB arrangement of sub-pixels in the horizontal direction may vary from one pixel to another. In this example, the RGB arrangement of sub-pixels changes every two rows. In the pixel matrix including RGB vertical stripe arrangement, the units of rows agree with the units of pixels, and the units of columns agree with the units of sub-pixels.

The image data 201 for left eye is shot by a camera for left eye at a specific viewing position, and the image data 251 for right eye is shot by a camera for right eye at the same viewing position. The image data 201 and 251 are made up of pixel data 203 to 229 and 253 to 279, respectively, corresponding to information depending on the degree of opening of the shutter for each sub-pixel. Pixel data for left eye 203, 205, 207 and 209 and pixel data for right eye 253, 255, 257 and 259 correspond to the substantially same position of an object, but have different values due to binocular parallax.

Pixel data of sub-pixels corresponding to the positions making up the pixel stripe 107 is extracted from the image data 201, 251 to create the stereoscopic image data 110. A set of multiple pieces of pixel data to be set at the pixel stripe 107 such as pixel data 203, 205, 207 and 209 will be referred to as a data stripe. A data stripe 203 to 209 for left eye and a data stripe 253 to 259 for right eye are disposed at adjacent pixel stripes 107 of the pixel matrix 105. Then, next to these stripes, a data stripe 213 to 219 for left eye and a data stripe 263 to 269 for right eye are disposed, and next to these stripes, a data stripe 223 to 229 for left eye and a data stripe 273 to 279 for right eye are disposed.

Then, the data stripes for left eye are set as the pixel stripes 107 corresponding to the cylindrical lenses 101b (L) for left eye, and the data stripes for right eye are set as the pixel stripes 107 corresponding to the cylindrical lenses 101b (R) for right eye. That is, data stripes for left eye and data stripes for right eye are alternately incorporated into the pixel stripes 107 arranged in the horizontal direction so as to correspond to the cylindrical lenses 101b (L) and (R), thus creating the stereoscopic image data 110.

Figure 3:
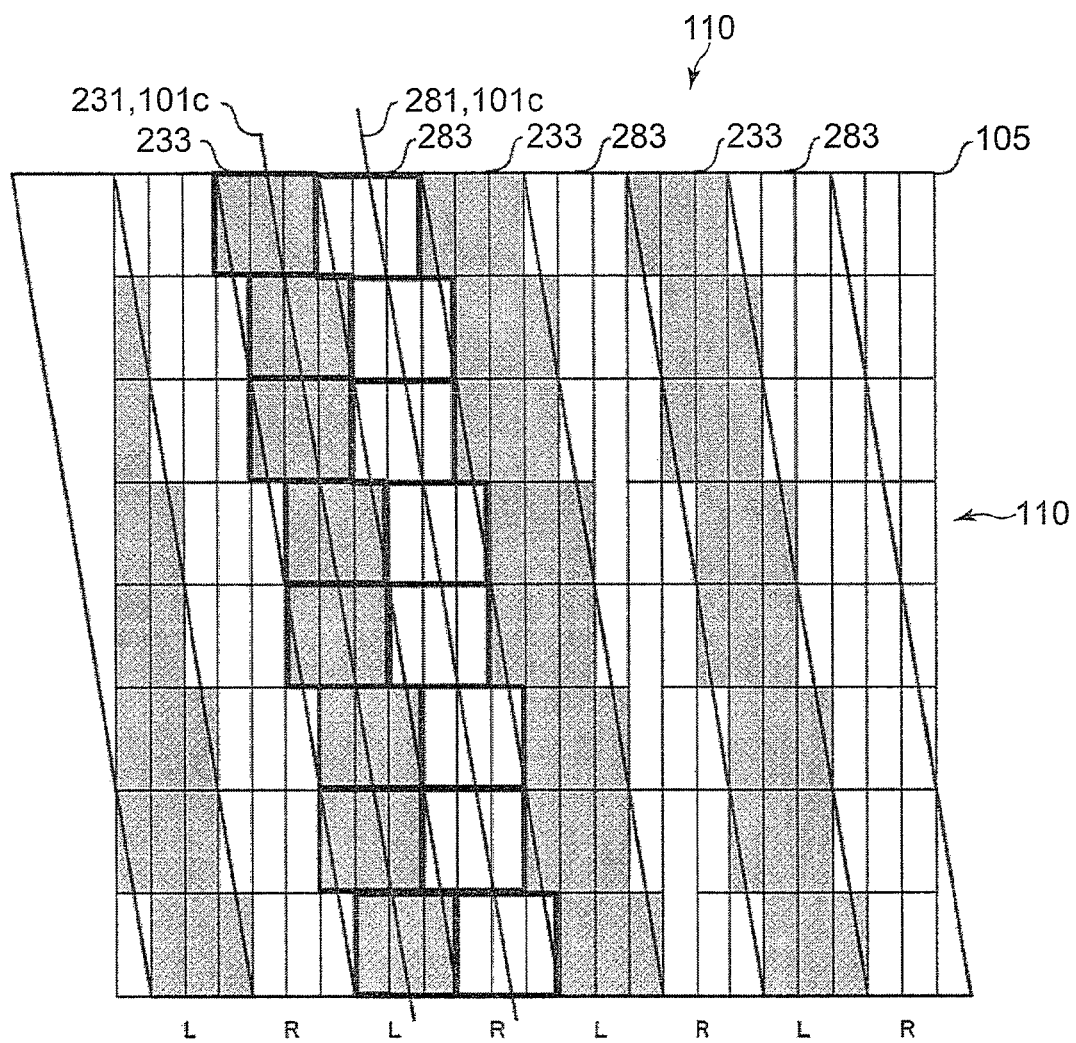
FIG. 3 shows a state where stereoscopic image data is set at a pixel matrix.

FIG. 3 shows a state where the stereoscopic image data 110 is set at the pixel matrix 105. A left-eye data stripe 233 is set at a pixel stripe 107 corresponding to a cylindrical lens 101b (L), and a right-eye data stripe 283 is set at a pixel stripe 107 corresponding to a cylindrical lens 101b (R). In FIG. 3, the stripe center 231 of the left-eye data stripe 233 agrees with the long axis 101c of the cylindrical lens 101b (L), and the stripe center 281 of the right-eye data stripe 283 agrees with the long axis 101c of the cylindrical lens 101b (R).

Such a position of the stereoscopic image data 110 at the pixel matrix 105 where the stripe centers 231 and 281 agree with the long axis 101c will be called a home position. At the home position, light emitted from the cylindrical lenses 101b (L) is concentrated at a concentrating point of the left eye corresponding to a predetermined viewing position located at the space in front of the lenticular sheet 101, and light emitted from the cylindrical lenses 101b (R) is concentrated at a concentrating point of the right eye. For the stereoscopic image data 110 set at the home position, the viewing position is desirably formed at the front space on the line passing through the center of the FPD 103 in the horizontal direction. In the current disclosure, the horizontal direction of sub-pixels is referred to as lengthwise and the vertical direction is referred to as crosswise. In the present embodiment, the lengthwise-to-crosswise length ratio of a sub-pixel is 1:3, and the tilted angle θ of the long axis 101c is arctan (⅙), for example.

FIGS. 4A-4C, 5A-5C and 6 show states where the viewing position moves by shifting setting positions of the stereoscopic image data at the pixel matrix 105. FIGS. 4A-4C, 5A-5C and 6 show the setting positions of the stereoscopic image data 110 at the pixel matrix 105 viewed from the front when the viewer existing at the space in front of the lenticular sheet 101 moves from the viewing position corresponding to the home position of FIG. 3 to the right.

FIG. 4A shows a state where stereoscopic image data is set at the home position of the pixel matrix 105. At the home position, light beams radiated from the pixel stripes 107, at which the stereoscopic image data 110 is set, pass through the cylindrical lenses 101b (L) and 101b (R) to be refracted, and in one example, the light beams are concentrated at concentrating positions for left and right viewpoints while setting, as the viewing position, the position that is away from the stereoscopic image display device 100 by a predetermined distance where the line passing through the center of the stereoscopic image display device 100 in the horizontal direction passes through. Each drawing clearly describes pixel data 257 making up the right-eye data stripe 283 and the stripe center 281 for easy understanding of the mechanism to move the setting position of the stereoscopic image data 110 in the horizontal direction.

FIG. 4B shows a state where the setting position of all pixel data making up the stereoscopic image data 110 is shifted from the home position by one sub-pixel (one row) vertically downward. It can be understood that shifting of the setting position of the stereoscopic image data 110 downward by one row causes shifting of the stripe center 281 from the home position by 0.5 times the lengthwise length of a sub-pixel horizontally to the left. The concentrating positions of light beams radiated from the pixel matrix 105, at which the stereoscopic image data 110 is set at the position of FIG. 4B, and passing through the cylindrical lenses 101b (L) and 101b (R) shift to the right of the viewer by the amount corresponding to the movement of the stripe center 281 from the concentrating position of the home position.

At this time, since the setting position of the stereoscopic image data 110 at the pixel matrix 105 is shifted vertically downward from the home position by one sub-pixel, the stereoscopic image data 110 set at the sub-pixels in the lowermost row of the pixel matrix 105 at the home position will not be displayed. Further, since stereoscopic image data to be set for sub-pixels in the uppermost row is not included in the stereoscopic image data 110 set at the home position, interpolated data created from the stereoscopic image data 110 to be set for nearby rows or interpolated data received from the system is set. Even when the setting position of the stereoscopic image data 110 changes from the home position by one row, the viewer hardly feels a change in the image.

FIG. 4C shows a state where the setting position of all pixel data is shifted horizontally to the left by one sub-pixel (one column) from the home position. This drawing also shows a state where the setting position of FIG. 4B is shifted vertically upward by one row and then is shifted horizontally to the left by one column. It can be understood that, in FIG. 4C, the stripe center 281 is shifted horizontally to the left from the home position by the lengthwise length of a sub-pixel. The concentrating position of light beams radiated from the pixel matrix 105, at which the stereoscopic image data 110 is set at the position of FIG. 4C, shifts to the right of the viewer by the amount corresponding to the movement of the stripe center 281 from the concentrating position of FIG. 4B.

At this time, since the setting position of the stereoscopic image data 110 at the pixel matrix 105 is shifted horizontally to the left from the home position by one sub-pixel, the stereoscopic image data 110 of one column set in the leftmost column of the pixel matrix 105 at the home position will not be displayed. Further, since the stereoscopic image data to be set for sub-pixels in the rightmost column is not included in the stereoscopic image data 110 set at the home position, interpolated data created from the stereoscopic image data 110 to be set for nearby columns or interpolated data received from the system is set.

The setting position of the stereoscopic image data 110 in FIG. 4C is for viewing at a new viewing position moving to the right, and even when the stereoscopic image data 110 is shifted to the left by one column, the viewer hardly feels a change in the image. Comparison between FIG. 4A and FIG. 4C shows that the RGB arrangement of pixels to set pixel data 257 changes. Whereas at the home position of FIG. 4A, they are arranged in the order of GBR from the left, they are arranged in the order of RGB from the left in FIG. 4C. The stereoscopic image data 110 is reconfigured so that the pixel data set for each sub-pixel at the home position will be pixel data of a sub-pixel in the same color at the setting position after shifting horizontally to the left by one sub-pixel.

In FIGS. 5A-5C to FIG. 6, the shifting of rows vertically upward and the shifting of columns horizontally to the left are repeated in a similar manner. Interpolated data is set for the lowermost row or the rightmost column of the pixel matrix 105. FIG. 5A shows a state where the stereoscopic image data 110 is shifted from the position of FIG. 4C vertically downward by one pixel. The stripe center 281 of the stereoscopic image data 110 shifted vertically downward by one row is shifted from the home position to the left by 1.5 times the lengthwise length of a sub-pixel. The concentrating position of light beams radiated from the pixel matrix 105, at which the stereoscopic image data 110 is set at the position of FIG. 5A, shifts to the right of the viewer by the amount corresponding to the movement of the stripe center 281 from the concentrating position of FIG. 4C.

FIG. 5B shows a state where the setting position of all pixel data is shifted horizontally to the left by two sub-pixels from the home position. This drawing also shows a state where the position of FIG. 5A is shifted vertically upward by one row and then is shifted horizontally to the left by one column. In FIG. 5B, the stripe center 281 is shifted horizontally to the left from the home position by twice the lengthwise length of a sub-pixel. The concentrating position of light beams radiated from the pixel matrix 105, at which the stereoscopic image data 110 is set at the position of FIG. 5B, shifts to the right of the viewer by the amount corresponding to the movement of the stripe center 281 from the concentrating position of FIG. 5A.

FIG. 5C shows a state where the setting position of all pixel data is shifted vertically downward by one pixel from the position of FIG. 5B. In FIG. 5C, the stripe center 281 is shifted to the left from the home position by 2.5 times the lengthwise length of a sub-pixel. The concentrating position of light beams radiated from the pixel matrix 105, at which the stereoscopic image data 110 is set at the position of FIG. 5C, shifts to the right of the viewer by the amount corresponding to the movement of the movement of the stripe center 281 from the concentrating position of FIG. 5B.

Figure 6:
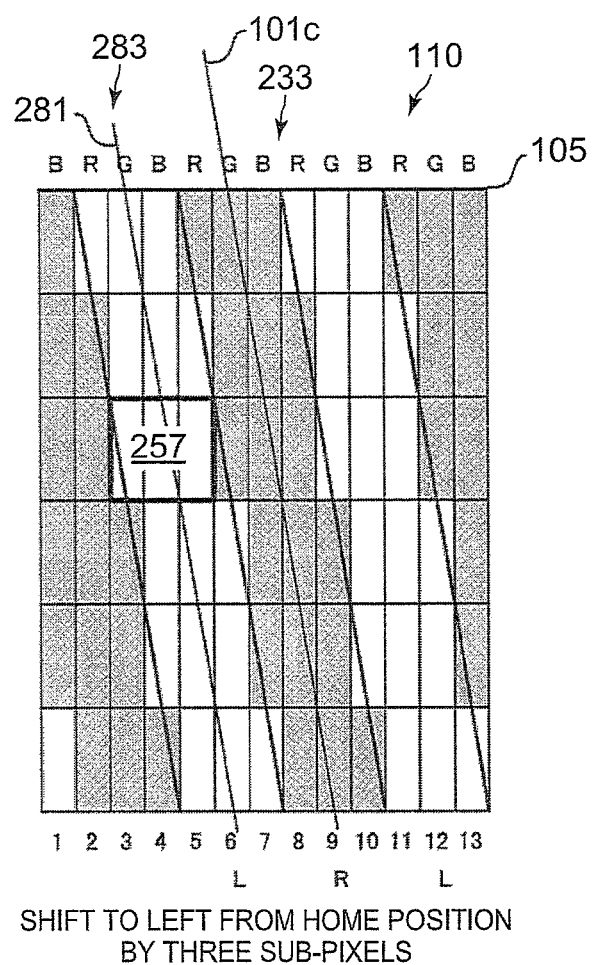
FIG. 6 shows a state where a viewing position moves by shifting the setting position of stereoscopic image data at a pixel matrix.

FIG. 6 shows a state where the setting position of all pixel data is shifted horizontally to the left by three sub-pixels from the home position. This drawing also shows a state where the position of FIG. 5C is shifted vertically upward by one row and then is shifted horizontally to the left by one column. In FIG. 6, the stripe center 281 is shifted to the left from the home position by three times the lengthwise length of a sub-pixel. Although the right-eye data stripe 283 is set for the cylindrical lens 101*b* (R) in FIG. 4A, the left-eye data stripe 233 is set for the same cylindrical lens 101*b* (R) in FIG. 6.

That is, in the case where one pixel corresponds to one cylindrical lens 101*b* in the horizontal direction, shifting of the setting position of all pixel data from the home position by one pixel to the left or right reverses a relationship between the cylindrical lens 101*b* (L) and the left-eye data stripe 233 and a relationship between the cylindrical lens 101*b* (R) and the right-eye data stripe 283 from those at the home position. Viewing of an image of light concentrated in this state will be a stereoscopic image where the parallax is inverted between the left eye and the right eye.

Thus, the setting position of the stereoscopic image data 110 is returned to the home position at the position of FIG. 6. Returning it to the home position eliminates the necessity to set interpolated data to sub-pixels in the rightmost column. The concentrating position of light beams radiated from the pixel matrix 105, at which the stereoscopic image data 110 is set at the position of FIG. 6, shifts to the right of the viewer by the amount corresponding to the movement of the stripe center 281 from the concentrating position of FIG. 5C.

Figures 7A, 7B, 7C:
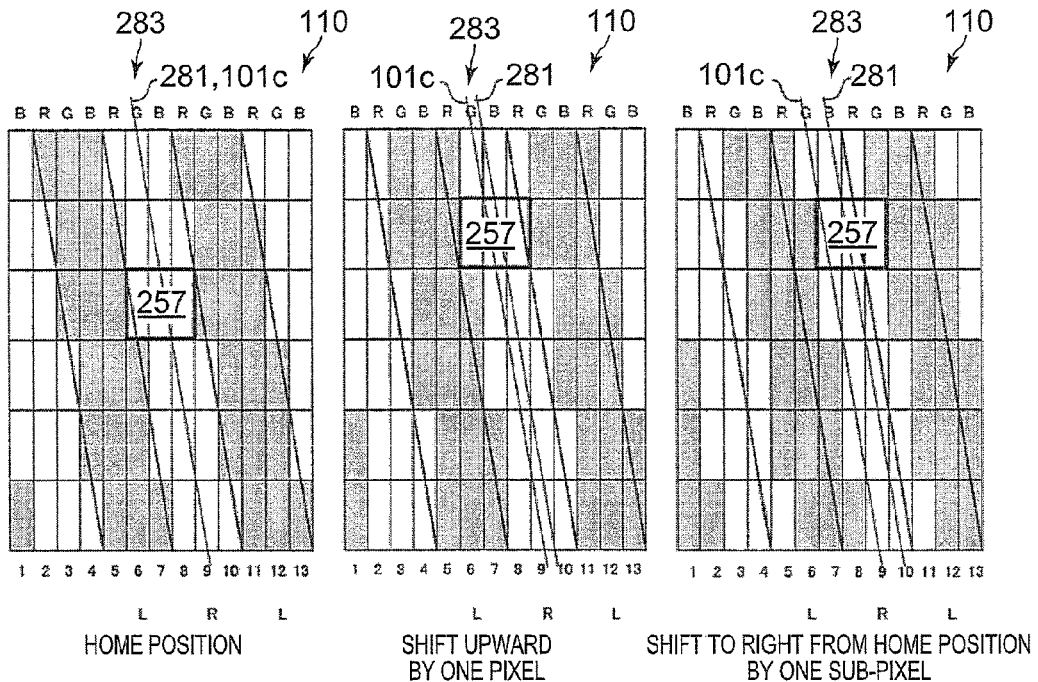
FIGS. 7A-7C show how to set stereoscopic image data at a pixel matrix when the viewer moves to the left.

FIGS. 7A-7C show how to set the stereoscopic image data 110 at the pixel matrix 105 when the viewer moves to the left. FIG. 7A shows the setting position at the same home position as in FIG. 4A. FIG. 7B shows a state where the setting position of all pixel data making up the stereoscopic image data 110 is shifted vertically upward by one pixel from the home position. In FIG. 7B, the stripe center 281 is shifted to the right from the home position by 0.5 times the lengthwise length of a sub-pixel. The concentrating position of light beams radiated from the pixel matrix 105, at which the stereoscopic image data 110 is set at the position of FIG.

7B, shifts to the left of the viewer by the amount corresponding to the movement of the stripe center 281 from the home position.

FIG. 7C shows a state where all pixel data is shifted horizontally to the right by one sub-pixel from the home position. This drawing also shows a state where the position of FIG. 7B is shifted vertically downward by one row and then is shifted horizontally to the right by one column. In FIG. 7C, the stripe center 281 is shifted to the right from the home position by the lengthwise length of a sub-pixel. The concentrating position of light beams radiated from the pixel matrix 105, at which the stereoscopic image data 110 is set at the position of FIG. 7C, shifts to the right of the viewer by the amount corresponding to the movement of the stripe center 281 from the concentrating position of FIG. 7B. The subsequent procedure will be understood by referring to the procedure of FIG. 5 and FIG. 6.

Figure 8:
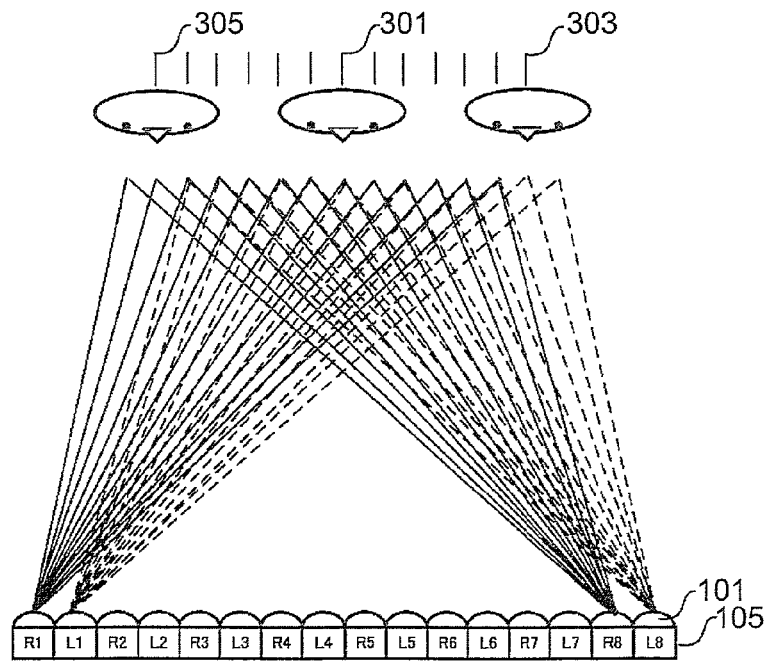
FIG. 8 shows the movement of a viewing position in a space when the setting position of the stereoscopic image data is shifted by the procedure of FIGS. 4A-4C to 7A-7C.

FIG. 8 shows the movement of a viewing position in the front space when the setting position of the stereoscopic image data 110 is shifted by the procedure of FIGS. 4A-4C, 5A-5C, 6 and 7A-7C. A viewing position 301 corresponds to the center of the pixel matrix 105 in the horizontal direction where light of the left-eye data stripe 233 and the right-eye data stripe 283 is concentrated when the stereoscopic image data 110 is set at a home position. Viewing positions 303 and 305 correspond to positions where light of the left-eye data stripe 233 and the right-eye data stripe 283 is concentrated when the stereoscopic image data 110 is shifted from the home position horizontally to the right and the left, respectively, by one pixel.

Between the viewing position 301 and the viewing position 303 or the viewing position 305, there are five viewing positions where light beams radiated from the pixel matrix 105 are concentrated, which are set at positions where the stripe centers 231 and 281 are shifted every ½ of the lengthwise length of a sub-pixel. Although the viewer can view a clear stereoscopic image at each viewing position, the image becomes unclear during the movement from a viewing position to the next viewing position. In the present embodiment, the setting position is shifted in units smaller than one sub-pixel, thus increasing the number of viewing positions or shortening the distance between viewing positions, and so allowing the viewer to view a clear stereoscopic image continuously during the movement to left and right.

FIGS. 9A-9B describe a relationship among the lengthwise-to-crosswise ratio a, the tilted angle θ and the unit movement amount of the stripe center in the horizontal direction. FIG. 9A shows the case where colors of RGB are arranged in vertical stripes and FIG. 9B shows the case where colors of RGB are arranged in horizontal stripes. In either case, letting that the tilted angle of the cylindrical lens 101b is θ and the lengthwise-to-crosswise ratio of the lengths of a sub-pixel is lengthwise:crosswise=1:a, the unit movement amount y of a stripe center in the horizontal direction is a×tan θ when sub-pixels to set the stereoscopic image data 110 are shifted vertically by one row. Appropriate setting of the lengthwise-to-crosswise ratio a and the tangent of the tilted angle θ and shifting of the setting position of the stereoscopic image data 110 vertically in the units of sub-pixels enable the unit movement amount y to be a value smaller than the lengthwise length of a sub-pixel.

For instance, setting that the lengthwise-to-crosswise ratio a=3 and tan θ=¼, ⅕, ⅙, ⅐, then y=¾, ⅗, ½, 3/7. Given one of the lengthwise-to-crosswise ratio a and the tilted angle θ, in order to make y<1, the other parameter may be selected so that tan θ<(1/a). Given the lengthwise-to-crosswise ratio a, a smaller tangent of the tilted angle θ yields a smaller unit movement amount y. Given the tilted angle θ, a smaller lengthwise-to-crosswise ratio a yields a smaller unit movement amount y.

The description so far exemplifies the pixel matrix 105 including RGB vertical stripe arrangement, and the present invention is not especially limited in the color configuration of the pixel matrix. The pixel matrix may be RGB horizontal stripe arrangement, L-letter arrangement or delta arrangement. In the pixel matrix of RGB horizontal stripe arrangement, the units of rows correspond to the units of sub-pixels and the units of columns correspond to the units of pixels. The above description exemplifies stereoscopic display of stereoscopic image data for two viewpoints, and the present invention is applicable to the case of stereoscopic display of stereoscopic image data for multi-viewpoints as well.

FIG. 10 shows an example where pixel stripes to display stereoscopic image data are made up of three RGB sub-pixels configured along a line parallel to the long axis of a cylindrical lens. In this configuration, one pixel is made up of, for example, #1 sub-pixel R, #1 sub-pixel G located downward by two sub-pixels from the adjacent sub-pixel and #1 sub-pixel B located downward by two sub-pixels from the adjacent sub-pixel, so that image data of six viewpoints can be set for sub-pixels corresponding to one cylindrical lens. Light beams radiated from pixel stripes, at which data stripes are set, are concentrated at predetermined viewing positions in the left-right direction of the viewer. In this case also, the number of viewing positions can be increased by setting the stereoscopic image data at a position shifted vertically by the procedure described in FIGS. 4 to 7.

Figure 11:
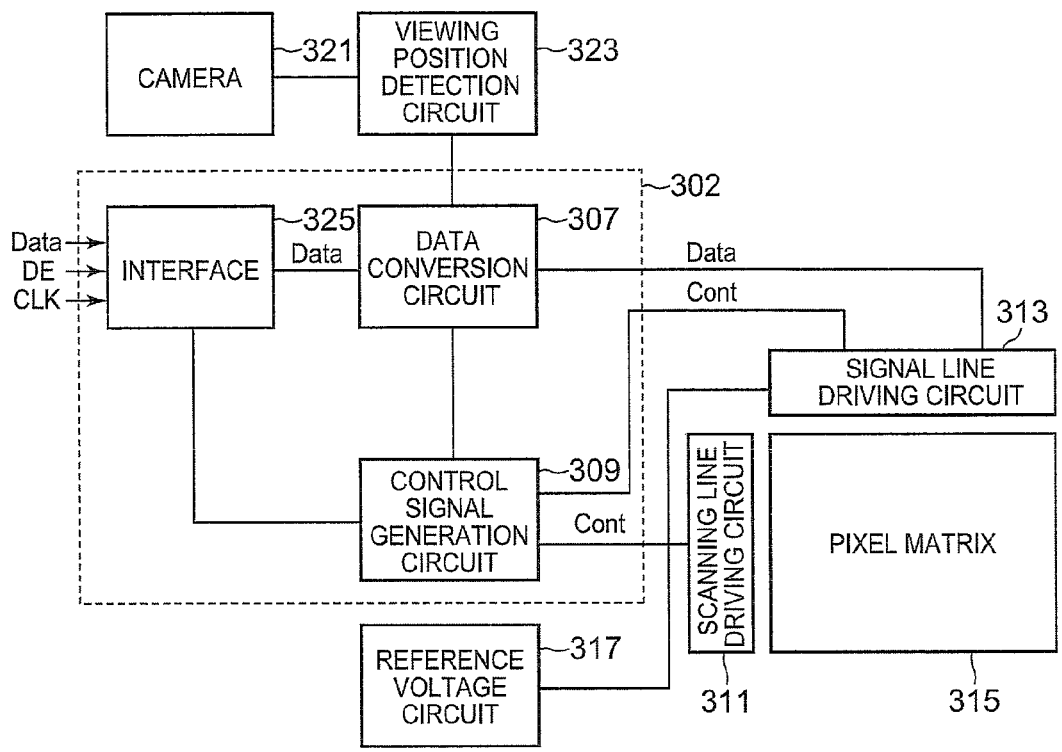
FIG. 11 is a block diagram of a stereoscopic image display system.
Figure 12:
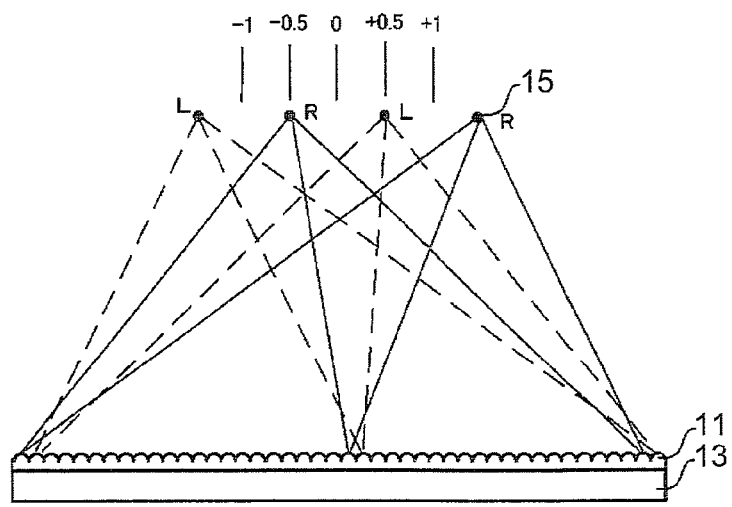
FIG. 12 describes a problem relating to a setting position of stereoscopic image data and a viewing position.

FIG. 11 is a functional block diagram showing the configuration of a stereoscopic image display system 300. A FPD including a pixel matrix 315 may be an active matrix type liquid crystal display device, for example. The liquid crystal display device includes: the pixel matrix 315 disposed on an array/cell substrate; a signal line driving circuit 313; a scanning line driving circuit 311; a reference voltage circuit 317; and a signal control circuit 302, and further includes a backlight and a backlight driving circuit, which are not illustrated. The stereoscopic image display system 300 includes, in addition to the liquid crystal display device, a camera 321 and a viewing position detection circuit 323.

The camera 321 shoots a viewer existing in front of the liquid crystal display device and sends image data to the viewing position detection circuit 323 in real time. The viewing position detection circuit 323 specifies, as a viewing position, a relative position of the viewer with reference to the liquid crystal display device based on the image data, and sends a signal indicating the viewing position to a data conversion circuit 307. The signal control circuit 302 includes an interface 325, the data conversion circuit 307 and a control signal generation circuit 309. The interface 325 receives, from a GPU of the system, a RGB data signal (Data), a data enable signal (DE) and a clock signal (CLK).

The RGB data signal received by the interface 325 is stereoscopic image data to be set for the home position. The stereoscopic image data is made up of image data for left eye and image data for right eye, and is serial-transferred to the signal line driving circuit 313 and is set at the pixel matrix 315 as in FIG. 3. The data conversion circuit 307 converts, based on the signal indicating the viewing position and received from the viewing position detection circuit 323, the stereoscopic image data received from the interface 325 into stereoscopic image data where the setting position at the pixel matrix 315 is shifted vertically or horizontally from the home position.

Each frame of the stereoscopic image data received by the interface 325 is made up of pixel data in number corresponding to the size of the pixel matrix 315, for example, and so the shifting of the setting position will generate a row or a column of sub-pixels where pixel data is no longer displayed or there is no pixel data to be displayed. Then, the data conversion circuit 307 generates interpolated data to be set for sub-pixels of a row or a column at the end where no pixel data exists, and adds the same to the stereoscopic image data after conversion.

In another example, each frame of the stereoscopic image data received by the interface 325 may include pixel data of rows or columns in the maximum number that may be shifted vertically or horizontally. In this case, the data conversion circuit 307 discards pixel data of a row and a column at the end of each frame at the home position so as to match with the size of the pixel matrix 315 for outputting. Then, when shifting vertically or horizontally, the data conversion circuit 307 can use extra pixel data received from the interface 325 for outputting.

The control signal generation circuit 309 generates, based on the data enable signal (DE) and the clock signal (CLK) received from the interface 325, a horizontal synchronization signal, dot clocks (DCK), a polarity reversion signal, an output control signal and the like, and sends them to the signal line driving circuit 313. The control signal generation circuit 309 further generates a vertical synchronous signal, gate clocks (GCK) and the like, and sends them to the scanning line driving circuit 311. The reference voltage circuit 317 supplies reference voltage to convert 8-bit pixel data indicating a gray scale to voltage corresponding to the brightness to the signal line driving circuit 313. In the present invention, a system on the higher-rank side of the interface 325 may detect a viewing position and may send stereoscopic image data subjected to conversion, the stereoscopic image data being created based on the viewing position, to the interface 325.

As has been described, the present disclosure provides a method for setting stereoscopic image data at a stereoscopic image display device system. The stereoscopic image display system can be provided within a mobile computer, a stereoscopic image television, car navigation system, etc.

While the disclosure has been particularly shown and described with reference to a preferred embodiment, it will be understood by those skilled in the art that various changes in form and detail may be made therein without departing from the spirit and scope of the disclosure.

What is claimed is:

1. A method comprising:
providing a light beam controller having a long axis tilted relative to a plurality of vertical lines at a predetermined tilted angle, wherein said light beam controller is configured to concentrate light beams emitted from a pixel matrix at a predetermined position, wherein said pixel matrix includes a plurality of sub-pixels disposed at intersections of horizontal lines and vertical lines;
setting stereoscopic image data at a home position of said pixel matrix in order to concentrate light at a first viewing position; and
setting stereoscopic image data at a second position in order to concentrate light at a second viewing position located in a direction of said horizontal lines corresponding to left-right direction of a viewer, wherein said second position is shifted from said home position by one row of said horizontal lines in a direction of said vertical lines corresponding to said up-down direction of said viewer, and by less than one sub-pixel distance in a direction of said horizontal lines corresponding to said left-right direction of said viewer.

2. The method of claim 1, wherein said sub-pixels have color arrangement of vertical pixel stripes.

3. The method of claim 2, wherein pixel stripes making up stereoscopic image data for left eye and the data stripes making up stereoscopic image data for right eye are disposed alternately in the direction of said horizontal lines.

4. The method of claim 2, wherein said pixel stripes include stereoscopic image data shot at a plurality of viewpoints.

5. The method of claim 1, wherein one pixel of said pixel matrix is made up of a plurality of sub-pixels in different colors that are adjacent in a direction of said horizontal lines.

6. The method of claim 1, wherein stereoscopic image data is set at pixels made up of a plurality of sub-pixels in different colors disposed along a plurality of lines parallel to said long axis of said light beam controller.

7. The method of claim 1, further comprising
detecting a position of said viewer of said stereoscopic image display device; and
determining a direction and a number of rows of said horizontal lines need to be shifted, in response to said detected position of said viewer.

8. The method of claim 1, wherein said stereoscopic image data is set at pixel stripes made up of said plurality of sub-pixels, each pixel stripe being corresponding to each element of said light beam controller, and said stereoscopic image data makes up data stripes, each pixel stripe having a center line that is shifted by a length shorter than a lengthwise length of each sub-pixel in a direction of said horizontal lines when a setting position of said stereoscopic image data is shifted by one row of said horizontal lines from said home position.

9. The method of claim 1, wherein said plurality of sub-pixels make up one pixel, and the number of sub-pixels making up one pixel stripe is an integral multiple of the number of sub-pixels making up one pixel.

10. The method of claim 1, wherein each sub-pixel has a crosswise length that is a times a lengthwise length and a tilted angle is θ, a center line at an element of said light beam controller is shifted by a×tan θ in the direction of horizontal lines when a setting position of said stereoscopic image data is shifted by one row of said horizontal lines from said home position.

11. A stereoscopic image display system comprising:
a light beam controller having a long axis that is tilted relative to a plurality of vertical lines at a predetermined tilted angle, wherein said light beam controller is configured to concentrate light beams emitted from a pixel matrix at a viewing position, wherein said pixel matrix includes a plurality of sub-pixels disposed at intersections of horizontal lines and vertical lines;
a data conversion circuit for converting stereoscopic image data to be set at a home position of said pixel matrix in order to concentrate light at a first viewing position, and to be set at a second position in order to concentrate light at a second viewing position corresponding to left-right direction of a viewer, wherein said second position is shifted from said home position by one row of said horizontal lines in a direction of said vertical lines corresponding to said up-down direction of said viewer, and by less than one sub-pixel distance in a direction of said horizontal lines corresponding to said left-right direction of said viewer; and a viewing position detection circuit that detects a viewing position of said viewer, wherein said data conversion circuit determines a direction and the number of rows of said horizontal lines need to be shifted in response to a detected viewing position rom said viewing position detection circuit.

12. The system of claim 11, wherein said light beam controller is a lenticular sheet.

13. The system of claim 11, wherein said viewing position detection circuit includes a camera.

\* \* \* \* \*